(12) United States Patent
Schinkel et al.

(10) Patent No.: US 8,852,739 B2
(45) Date of Patent: Oct. 7, 2014

(54) CARBON BLACK, METHOD FOR THE PRODUCTION THEREOF, AND USE THEREOF

(75) Inventors: Arndt-Peter Schinkel, Marienhausen (DE); Michael Stanyschöfsky, Hürth (DE); Conny Vogler, Ruppichteroth (DE); Joachim Fröhlich, Neumarkt (DE); Bernhard Schwaiger, Erftstadt (DE); Thomas Pelster, Brühl (DE)

(73) Assignee: Evonik Carbon Black GmbH, Hanau (DE)

( * ) Notice: Subject to any disclaimer, the term of this patent is extended or adjusted under 35 U.S.C. 154(b) by 361 days.

(21) Appl. No.: 13/031,694

(22) Filed: Feb. 22, 2011

(65) Prior Publication Data

US 2011/0207872 A1   Aug. 25, 2011

(30) Foreign Application Priority Data

Feb. 23, 2010   (DE) .................. 10 2010 002 244

(51) Int. Cl.
| | |
|---|---|
| B32B 5/16 | (2006.01) |
| B60C 1/00 | (2006.01) |
| C08L 9/00 | (2006.01) |
| C09C 1/48 | (2006.01) |
| C09C 1/50 | (2006.01) |
| B82Y 30/00 | (2011.01) |
| B29K 7/00 | (2006.01) |
| B29K 9/00 | (2006.01) |

(52) U.S. Cl.
CPC ... *C09C 1/50* (2013.01); *C09C 1/48* (2013.01); *C01P 2006/19* (2013.01); *B29K 2007/00* (2013.01); *B60C 1/00* (2013.01); *C01P 2004/64* (2013.01); *B29K 2009/00* (2013.01); *B82Y 30/00* (2013.01); *C01P 2006/12* (2013.01)
USPC ............................ 428/402; 524/571; 524/495

(58) Field of Classification Search
USPC ................................ 428/402; 524/495, 571
See application file for complete search history.

(56) References Cited

U.S. PATENT DOCUMENTS

| | | | |
|---|---|---|---|
| 3,133,893 A | 5/1964 | Newmann | |
| 3,314,814 A | 4/1967 | Newman | |
| 3,519,452 A | 7/1970 | Rivin | |
| 3,660,133 A | 5/1972 | Van Der Schuyt et al. | |
| 3,705,043 A | 12/1972 | Zabiak | |
| 3,749,670 A | 7/1973 | Ormsbee | |
| 3,841,888 A | 10/1974 | Belde | |
| 3,903,034 A | 9/1975 | Zabiak et al. | |
| 3,946,138 A | 3/1976 | Jones | |
| 3,978,019 A | 8/1976 | Oelmann et al. | |
| 3,998,652 A | 12/1976 | Aign | |
| 4,055,439 A | 10/1977 | Babler | |
| 4,075,160 A | 2/1978 | Mills | |
| 4,076,527 A | 2/1978 | Nealy | |
| 4,243,994 A | 1/1981 | Kobayashi et al. | |
| 4,366,139 A | 12/1982 | Kuhner | |
| 4,368,582 A | 1/1983 | Graser | |
| 4,435,377 A | 3/1984 | Rothbuhr | |
| 4,435,378 A | 3/1984 | Reck | |
| 4,486,033 A | 12/1984 | Parrotta | |
| 4,536,776 A | 8/1985 | Knirsch | |
| 4,698,913 A | 10/1987 | Voll | |
| 4,755,358 A | 7/1988 | Voll et al. | |
| 4,756,759 A | 7/1988 | Amon et al. | |
| 4,836,852 A | 6/1989 | Knirsch | |
| 4,879,335 A | 11/1989 | Hirota | |
| 4,909,853 A | 3/1990 | Wienkenhover | |
| 4,963,616 A | 10/1990 | Jenekhe | |
| 5,021,291 A | 6/1991 | Kobayashi | |
| 5,085,698 A | 2/1992 | Ma | |
| 5,164,232 A | 11/1992 | Henseleit | |
| 5,236,992 A * | 8/1993 | Bush ........................... 524/495 |
| 5,320,668 A | 6/1994 | Shields | |

(Continued)

FOREIGN PATENT DOCUMENTS

| | | |
|---|---|---|
| CA | 2207414 | 6/1996 |
| CA | 2 740 672 A1 | 4/2010 |

(Continued)

OTHER PUBLICATIONS

ASTM International D6556-10 "Standard Test Method for Carbon Balck—Total and External Surface Area by nitrogen Adsorption", pp. 1-5, Jan. 31 2012; obtained online from http://www.biochar-international.org/sites/default/files/ASTM%20D6556-10%20N2%20BET%20for%20Carbon%20Black%20.juhu2739.pdf.*
English language abstract for JP 6-228371.
Machine translation of JP 6-228371.
English language abstract for JP 6-279624.
English language abstract for JP 9-235485.
English language abstract for JP 10-140033.
English language abstract for JP 11-012487.
Machine translation of JP 11-012487.
English language abstract for JP 11-092686.
Machine translation of JP 11-092686.

(Continued)

*Primary Examiner* — Alexander Kollias
(74) *Attorney, Agent, or Firm* — Law Office of: Michael A. Sanzo, LLC

(57) ABSTRACT

The invention relates to a carbon black with a CTAB surface area of from 20 to 49 m$^2$/g, with a COAN greater than 90 ml/(100 g), and with a sum of OAN and COAN greater than 235 ml/(100 g). The carbon black is produced in a furnace reactor, where from 20 to 55% by weight of the feedstock used for the carbon black are introduced radially through a nozzle within the first third of the reaction zone, and the remaining amount of the feedstock used for the carbon black is introduced through a nozzle upstream at least one further point into the reactor. The carbon black can be used in rubber mixtures.

22 Claims, 1 Drawing Sheet

(56) References Cited

U.S. PATENT DOCUMENTS

| | | | |
|---|---|---|---|
| 5,382,621 A * | 1/1995 | Laube | 524/496 |
| 5,430,088 A | 7/1995 | Ohashi et al. | |
| 5,531,818 A | 7/1996 | Lin | |
| 5,554,739 A | 9/1996 | Belmont | |
| 5,609,671 A | 3/1997 | Nagasawa | |
| 5,620,743 A | 4/1997 | Harth | |
| 5,639,817 A | 6/1997 | Probst | |
| 5,672,198 A | 9/1997 | Belmont | |
| 5,713,988 A | 2/1998 | Belmont et al. | |
| 5,760,112 A | 6/1998 | Hirota | |
| 5,772,975 A | 6/1998 | Mise et al. | |
| 5,837,044 A | 11/1998 | Santilli | |
| 5,851,280 A | 12/1998 | Belmont | |
| 5,859,120 A | 1/1999 | Karl | |
| 5,863,468 A * | 1/1999 | Czubarow et al. | 252/519.5 |
| 5,900,029 A | 5/1999 | Belmont | |
| 5,922,118 A | 7/1999 | Johnson | |
| 5,929,134 A | 7/1999 | Lent | |
| 5,954,866 A | 9/1999 | Ohta et al. | |
| 5,977,209 A | 11/1999 | Breton | |
| 6,056,933 A | 5/2000 | Vogler et al. | |
| 6,063,182 A | 5/2000 | Babler | |
| 6,099,818 A | 8/2000 | Freund | |
| 6,132,505 A | 10/2000 | Linde | |
| 6,136,286 A | 10/2000 | Okuyama | |
| 6,171,382 B1 | 1/2001 | Stubbe | |
| 6,212,794 B1 | 4/2001 | Zhu | |
| 6,221,142 B1 | 4/2001 | Wang | |
| 6,224,735 B1 | 5/2001 | Akutsu | |
| 6,228,928 B1 | 5/2001 | Soeda et al. | |
| 6,242,382 B1 | 6/2001 | Bratz | |
| 6,251,983 B1 | 6/2001 | Vogler et al. | |
| 6,290,767 B1 | 9/2001 | Bergemann et al. | |
| 6,312,513 B1 | 11/2001 | Hoefer | |
| 6,337,302 B1 | 1/2002 | Teng | |
| 6,358,487 B1 | 3/2002 | Omae et al. | |
| 6,387,168 B1 | 5/2002 | Koitabashi | |
| 6,403,695 B1 | 6/2002 | Soeda et al. | |
| 6,451,100 B1 | 9/2002 | Karl | |
| 6,471,763 B1 | 10/2002 | Karl | |
| 6,491,976 B2 | 12/2002 | Horiuchi | |
| 6,503,311 B1 | 1/2003 | Karl | |
| 6,569,231 B1 | 5/2003 | Mathias | |
| 6,582,505 B1 | 6/2003 | Bouvy | |
| 6,646,023 B1 | 11/2003 | Nyssen | |
| 6,660,075 B2 | 12/2003 | Bergemann et al. | |
| 6,685,769 B1 | 2/2004 | Karl | |
| 6,715,420 B2 | 4/2004 | Blake | |
| 6,758,891 B2 | 7/2004 | Bergemann et al. | |
| 6,780,389 B2 | 8/2004 | Karl | |
| 6,783,836 B2 | 8/2004 | Bennett | |
| 6,821,334 B2 | 11/2004 | Nakamura | |
| 6,858,569 B2 | 2/2005 | Yokota et al. | |
| 6,956,006 B1 | 10/2005 | Mirsky | |
| 6,960,250 B2 | 11/2005 | Luethge et al. | |
| 7,005,004 B2 | 2/2006 | Kalbitz | |
| 7,160,377 B2 | 1/2007 | Zoch | |
| 7,172,652 B2 | 2/2007 | Zoch et al. | |
| 7,198,668 B2 | 4/2007 | Reisacher et al. | |
| 7,217,405 B2 | 5/2007 | Karl | |
| 7,300,964 B2 | 11/2007 | Niedermeier et al. | |
| 7,435,857 B2 | 10/2008 | Poellmann | |
| 8,236,274 B2 | 8/2012 | Quitmann et al. | |
| 8,328,930 B2 | 12/2012 | Tauber et al. | |
| 8,372,191 B2 | 2/2013 | Tauber et al. | |
| 8,574,527 B2 | 11/2013 | Stenger et al. | |
| 2001/0036994 A1 | 11/2001 | Bergemann | |
| 2002/0041317 A1 | 4/2002 | Kashiwazaki | |
| 2002/0156177 A1 * | 10/2002 | Freund | 524/496 |
| 2003/0000409 A1 | 1/2003 | Blake | |
| 2003/0013797 A1 | 1/2003 | Thielen et al. | |
| 2003/0101901 A1 | 6/2003 | Bergemann et al. | |
| 2003/0114350 A1 | 6/2003 | Schmitt et al. | |
| 2003/0134938 A1 | 7/2003 | Nakamura | |
| 2003/0180210 A1 | 9/2003 | Karl | |
| 2004/0087707 A1 | 5/2004 | Zoch | |
| 2004/0109944 A1 * | 6/2004 | Schmitt et al. | 427/212 |
| 2004/0123773 A1 | 7/2004 | Butler | |
| 2004/0202603 A1 | 10/2004 | Fischer et al. | |
| 2004/0248731 A1 | 12/2004 | Vogel et al. | |
| 2005/0014864 A1 | 1/2005 | Akers | |
| 2005/0062205 A1 | 3/2005 | Zak | |
| 2005/0090609 A1 | 4/2005 | Reisacher | |
| 2006/0086834 A1 | 4/2006 | Pfeffer | |
| 2006/0230550 A1 | 10/2006 | Hees | |
| 2006/0243165 A1 | 11/2006 | Luthge et al. | |
| 2007/0031319 A1 | 2/2007 | Luthge et al. | |
| 2007/0043157 A1 | 2/2007 | Riebel et al. | |
| 2007/0044682 A1 | 3/2007 | Nick | |
| 2007/0076068 A1 | 4/2007 | Guo | |
| 2007/0076071 A1 | 4/2007 | Iu | |
| 2008/0110552 A1 | 5/2008 | Arnold | |
| 2008/0214730 A1 | 9/2008 | Henry | |
| 2008/0219915 A1 | 9/2008 | Quitmann et al. | |
| 2009/0035210 A1 | 2/2009 | Krauss | |
| 2009/0155157 A1 | 6/2009 | Stenger et al. | |
| 2009/0305011 A1 | 12/2009 | McIntosh et al. | |
| 2010/0147187 A1 | 6/2010 | Tauber | |
| 2010/0180794 A1 | 7/2010 | Tauber | |
| 2010/0248120 A1 | 9/2010 | Riebel | |
| 2011/0034611 A1 | 2/2011 | Pelster et al. | |
| 2011/0232531 A1 | 9/2011 | Götz | |
| 2011/0236816 A1 * | 9/2011 | Stanyschofsky et al. | 430/108.9 |

FOREIGN PATENT DOCUMENTS

| | | |
|---|---|---|
| CN | 1858531 A | 11/2006 |
| DE | 203 711 C | 10/1908 |
| DE | 25 40 355 | 3/1976 |
| DE | 30 41 188 A1 | 6/1982 |
| DE | 36 15 571 A1 | 11/1987 |
| DE | 43 08 488 A1 | 9/1994 |
| DE | 195 21 565 | 1/1997 |
| DE | 196 13 796 | 10/1997 |
| DE | 197 31 572 | 1/1999 |
| DE | 197 48 575 | 5/1999 |
| DE | 198 39 925 A1 | 10/1999 |
| DE | 198 24 947 | 12/1999 |
| DE | 199 34 282 | 1/2001 |
| DE | 100 12 784 | 9/2001 |
| DE | 101 49 805 | 4/2003 |
| DE | 102 42 875 A1 | 5/2003 |
| DE | 102 38 149 | 2/2004 |
| DE | 10 2004 058 271 | 6/2006 |
| DE | 10 2007 026 214 A1 | 12/2008 |
| DE | 10 2007 026 551 | 12/2008 |
| EP | 0 036 520 A2 | 9/1981 |
| EP | 0 176 707 A1 | 4/1986 |
| EP | 0 259 130 A2 | 3/1988 |
| EP | 0 263 412 | 4/1988 |
| EP | 0 282 855 A2 | 9/1988 |
| EP | 0 608 892 | 8/1994 |
| EP | 0 655 516 A1 | 5/1995 |
| EP | 0 792 920 | 9/1997 |
| EP | 0 803 780 A1 | 10/1997 |
| EP | 0 857 764 A2 | 8/1998 |
| EP | 0 969 052 A1 | 1/2000 |
| EP | 0 982 378 | 3/2000 |
| EP | 1 061 106 A1 | 12/2000 |
| EP | 1 061 107 A1 | 12/2000 |
| EP | 1 103 173 A1 | 5/2001 |
| EP | 1 134 261 A2 | 9/2001 |
| EP | 1 167 470 A | 1/2002 |
| EP | 1 347 018 A1 | 9/2003 |
| EP | 1 783 178 | 5/2007 |
| FR | 1 233 251 A | 10/1960 |
| GB | 895990 | 5/1962 |
| JP | 1-272645 | 10/1989 |
| JP | 3-124772 | 5/1991 |
| JP | 4-18438 | 1/1992 |
| JP | 5-78110 | 3/1993 |
| JP | 6-228371 | 8/1994 |
| JP | 6-279624 | 10/1994 |
| JP | 7-258578 | 10/1995 |

(56) References Cited

FOREIGN PATENT DOCUMENTS

| | | |
|---|---|---|
| JP | 7-268148 | 10/1995 |
| JP | 08-015895 | 1/1996 |
| JP | 9-67528 | 3/1997 |
| JP | 9-124312 | 5/1997 |
| JP | 9-235485 | 9/1997 |
| JP | 10-140033 | 5/1998 |
| JP | 11-012487 | 1/1999 |
| JP | 11-092686 A | 4/1999 |
| JP | 11-158425 | 6/1999 |
| JP | 11-189735 | 7/1999 |
| JP | 11-189736 | 7/1999 |
| JP | 11-302557 | 11/1999 |
| JP | 11-315220 | 11/1999 |
| JP | 11-349309 | 12/1999 |
| JP | 2000-212468 | 8/2000 |
| JP | 2000-248118 | 9/2000 |
| JP | 2000-248194 | 9/2000 |
| JP | 2000-248196 | 9/2000 |
| JP | 2000-248197 | 9/2000 |
| JP | 2000-290529 | 10/2000 |
| JP | 2001-40240 | 2/2001 |
| JP | 2001-214068 | 8/2001 |
| JP | 2001-240768 | 9/2001 |
| JP | 2001-254033 | 9/2001 |
| JP | 2001-329205 | 11/2001 |
| JP | 2002-080758 | 3/2002 |
| JP | 2003-049101 | 2/2003 |
| JP | 2003-201418 A | 7/2003 |
| JP | 2004-067903 | 3/2004 |
| JP | 2004-75985 | 3/2004 |
| JP | 2004-224948 | 8/2004 |
| JP | 2006-008899 | 1/2006 |
| JP | 2006-022270 | 1/2006 |
| JP | 2006-052413 | 2/2006 |
| JP | 2006-126387 | 5/2006 |
| SU | 532612 | 2/1977 |
| SU | 887587 | 12/1981 |
| WO | WO 92/04415 | 3/1992 |
| WO | WO 92/13983 | 8/1992 |
| WO | WO 95/23038 | 8/1995 |
| WO | WO 96/18688 | 6/1996 |
| WO | WO 96/18690 | 6/1996 |
| WO | WO 96/18694 A2 | 6/1996 |
| WO | WO 97/32571 A1 | 9/1997 |
| WO | WO 98/42192 | 10/1998 |
| WO | WO 98/42778 | 10/1998 |
| WO | WO 98/45361 | 10/1998 |
| WO | WO 99/58617 | 11/1999 |
| WO | WO 00/09254 | 2/2000 |
| WO | WO 00/77104 | 12/2000 |
| WO | WO 01/55050 | 8/2001 |
| WO | WO 03/014238 A | 2/2003 |
| WO | WO 03/055959 A1 | 7/2003 |
| WO | WO 03/064540 A1 | 8/2003 |
| WO | WO 2004/046256 A1 | 6/2004 |
| WO | WO 2005/017047 A1 | 2/2005 |
| WO | WO 2005/022667 A2 | 3/2005 |
| WO | WO 2005/028978 A1 | 3/2005 |
| WO | WO 2006/061110 A1 | 6/2006 |
| WO | WO 2006/066132 A2 | 6/2006 |
| WO | WO 2007/027625 A2 | 3/2007 |
| WO | WO 2007/039604 A2 | 4/2007 |
| WO | WO 2008/148639 A2 | 12/2008 |
| WO | WO 2010/043562 A1 | 4/2010 |
| WO | WO 2010043562 * | 4/2010 ............... C09C 1/44 |

OTHER PUBLICATIONS

English language abstract for JP 11-349309.
Machine translation of JP 11-349309.
English language abstract for JP 2001-240768.
Machine translation of JP 2001-240768.
English language abstract for JP 2003-201418.
English language abstract for JP 2006-022270.
Machine translation of JP2006-022270.
English language abstract for JP 2001-214068.
Machine translation of JP2001-214068.
U.S. Appl. No. 13/538,861, filed Jun. 29, 2012, Quitmann, et al.
English language abstract for DE 100 12 784.
English language abstract for DE 101 49 805.
English language abstract for DE 102 38 149.
English language abstract for JP 2004-224948.
English language abstract for JP 2006-052413.
English language abstract for JP-2006-126387.
English language abstract for JP 10-510861.
English language abstract for RU 2173327.
English language abstract for RU 2200562.
English language abstract for RU 2211230.
Machine translation of JP 2004-224948.
Machine translation of JP 2006-052413.
Machine translation of JP-2006-126387.
European Search Report for application No. EP 11 15 4839.
English language translation of Written Opinion for application No. EP 11 15 4839.
English language abstract for WO 2010/043562 A1, listed as document B4 above.
*Chemielexikon Römpp*; RÖMPP Online-ID=RD-07-00259, Gas Black; http://www.roempp.com/prod/roemp.php.
"Improved Test for Determination of Carbon Black Structure" presented by Wesley Wampler; Carbon Black World 2004; Nov. 15, 2004; XP002637916.
U.S. Appl. No. 13/131,372, filed May 26, 2010, Götz.
English language abstract for JP 2002-080758.
Machine translation of JP 2002-080758.
English language abstract for JP 2003-049101.
Machine translation of JP 2003-049101.
English language abstract for JP 2004-067903.
Machine translation of JP 2004-067903.
Gerhartz, et al., "Gas Black and Channel Black," *Ulmann's Encyclopedia of Industrial Chemistry* A5:148-150; XP-002465931.
Gerspacher, M., "Dynamic Viscoelastic Properties of Loaded Elastomers," Chapter 11 Carbon Black, Donnet, et al. eds., Marcel Dekker Inc., New York, ed. 2 (1993) pp. 377-387.
Funt, et al., "Carbon Black in Plastics," Chapter 12 Carbon Black, Donnet, et al. eds., Marcel Dekker Inc., New York, ed. 2 (1993) p. 389-408.
English language abstract for Japanese patent reference JP 1-272645.
English language abstract for Japanese patent reference JP 4-18438.
English language abstract for Japanese patent reference JP 7-268148.
English language abstract for Japanese patent reference JP 11-302557.
English language translation of text of German patent reference DE 203 711 C.
English language abstract for CN 1858531 A.
English language abstract for DE 36 15 571.
English language abstract for DE197 31 572.
English language abstract for DE 198 24 947.
English language abstract for DE 10 2004 058 271.
English language abstract for DE 10 2007 026 214 A1.
English language translation of summary for FR 1 233 251.
English language abstract for JP 3-124772.
English language abstract for JP 5-78110.
English language abstract for JP 08-015895.
English language abstract for JP 9-67528.
English language abstract for JP 9-124312.
English language abstract for JP 11-158425.
English language translation for JP 11-189735.
English language abstract for JP 11-189736.
English language Abstract for JP 11-315220.
English language abstract for JP 2000-212468.
English language abstract for JP 2000-248197.
English language abstract for JP 2000-248194.
English language abstract for JP 2000-248118.
English language abstract for JP 2000-248196.
English language abstract for JP 2000-290529.
English language abstract for JP 2001-40240.
English language abstract for JP 2001-254033.
English language abstract for JP 2001-329205.
English language abstract for JP 2004-75985.

(56) References Cited

OTHER PUBLICATIONS

English language abstract for JP 2006-008899.
English language abstract for SU 532612.
English language abstract for SU 887587.
English language abstract for WO 92/13983.
English language abstract for WO 01/55050.
English language abstract for WO 03/055959.
Franklin, et al., "An Enhanced CVD Approach to Extensive Nanotube Networks with Directionality," *Advanced Materials* 12:890-894 (2000).

McMillan, et al., "High Velocity Attrition Nozzles in Fluidized Beds," *Powder Technology* 175:133-141 (2007).
Ohkita, et al., "The Competitive Reactions of Initiator Fragments and Growing Polymer Chains Against the Surface of Carbon Black," *Carbon* vol. 16:41-45 (1978).
Wang, et al., "Using Pulsed Flow to Overcome Defluidization," *Chemical Engineering Science* 60:5177-5181 (2005).
Donnet, et al., Carbon Black, Science and Technology, Second Edition, Copyright 1993 by Marcel Dekker, Inc., New York, New York, pp. 112, 113, 130 and 131.

\* cited by examiner

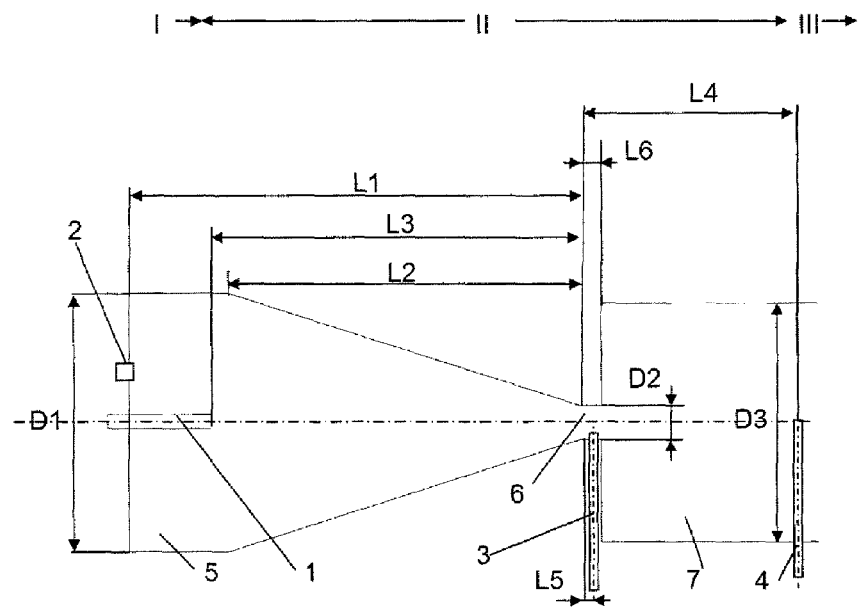

CARBON BLACK, METHOD FOR THE PRODUCTION THEREOF, AND USE THEREOF

CROSS REFERENCE TO RELATED APPLICATIONS

The present application claims priority to German Application DE 10 2010 002 244.6, filed on Feb. 23, 2010.

FIELD OF THE INVENTION

The invention relates to a carbon black, to a process for production of the same, and also to the use of the same.

BACKGROUND OF THE INVENTION

It is known (Donnet J.-B., Bansal R. C., Wang M. J. (ed.), Gersbacher M: Carbon Black, Marcel Dekker Inc., New York, (1993), ed. 2, p. 386) that the structure of the carbon black has a considerable effect on the reinforcement behavior of carbon black in rubber mixtures, given that there is good adhesion of the polymer to the carbon black. Another well-known fact is that as specific surface area rises there is an increase in hysteresis and therefore in energy dissipation under periodic stress-and-strain conditions. Abrasion resistance increases as specific surface area rises. Impression set increases as specific surface area increases, and this is particularly disadvantageous for gaskets, since there is an attendant reduction in the pressure exerted by the gasket. For this reason, low-surface-area carbon blacks are used in particular for technical rubber products for which abrasion resistance is not of particular importance. These carbon blacks can also be used in the region of the tire substructure. The relatively low specific surface area of the carbon blacks thus leads to lowering of hysteresis and thus also to reduced rolling resistance. As mentioned previously, structure has a decisive effect on reinforcement. An increase in rolling resistance, caused by the tire substructure, results in higher fuel consumption and thus higher carbon dioxide emission. This is undesirable for economic and environmental reasons.

It is also known (Donnet, Bansal, Wang (ed.), Funt J. M., Sifleet W. L., Tommé M.: Carbon Black, Marcel Dekker Inc., New York, (1993), ed. 2, p. 390) that good dispersion of the carbon black within the polymer is achieved if the structure (COAN, OAN) has sufficient magnitude.

For economic and environmental reasons it is therefore desirable to use a low specific surface area in order to lower the rolling resistance of the tire substructure. It would moreover be desirable to lower the weight of the component, by using improved reinforcing effect to reduce filler content and thus component density. For economic and process-technology reasons it would be desirable to use an improved reinforcing effect of the filler to permit replacement of polymer content by oil in the rubber formulation. Another factor essential to the effectiveness of the filler is the extent of dispersion, and it is therefore desirable to use a filler that is easy to disperse.

US 2008/0110552 A1 discloses a carbon black with COAN greater than 90 ml/(100 g) and smaller than 150 ml/(100 g), and with BET greater than 50 $m^2/g$ and smaller than 69 $m^2/g$. The distribution index DI, which is the ratio of $D_w$ to $D_{mode}$, is greater than 1.15.

These carbon blacks lead to a non-ideal hysteresis level in the rubber mixture, because specific surface area is still high.

US 2003/0013797 A1 discloses a carbon black with STSA of from 10 to 200 $m^2/g$, iodine number of from 15 to 250 mg/g, tint value of up to 130%, DBPA of from 20 to 450 ml/(100 g), CDBP of from 20 to 400 ml/(100 g), an iodine number:STSA ratio of from 0.4 to 2.5, an average particle size of from 14 to 250 nm, and less than 1% content of volatile constituents, in a polymer conductivity application.

US 005736992 A moreover discloses furnace blacks featuring specific STAB surface area of from 45 to 55 $m^2/g$, specific iodine number of from 48-58 mg/g, tint value of from 65 to 75%, CDBP of from 90 to 100 ml/(100 g), and DBP of from 122 to 132 ml/(100 g). Said carbon black is produced via radial and axial addition of the oil within the zone of restricted cross section of the furnace black reactor.

Disadvantages of these carbon blacks are the low OAN level and the small difference between OAN and COAN. The specific surface area of this carbon black is moreover still high, with the attendant disadvantages.

JP11-302557 A moreover discloses a carbon black which has STAB surface area of: from 25 to 60 $m^2/g$ and DBP/(ml/100 g)>0.6*CTAB/($m^2/g$) 4-120. A Stokes diameter complying with $$D_{st}/nm < 6000\ m^2/g/CTAB + 60$$

is moreover demanded for the mode. A result of this situation is that the carbon blacks produced in JP11-302557 A comprise relatively small aggregates.

These lead to a non-ideal property profile for the carbon blacks.

JP07-268148 discloses a carbon black which has DBP greater than 140 ml/(100 g). The particle size is stated as $d_p$=38 nm or 42 nm.

JP04-18438 discloses a carbon black with STSA<60 $m^2/g$ and DBP≤100 ml/(100 g).

JP01-272645 preferably uses a carbon black with an iodine number of from 10 to 40 ml/g and with DBP of from 100 to 500 ml/(100 g).

EP 1783178 discloses a furnace-black process in which a feedstock used for the carbon black is introduced in a first stage and is combined with a stream of hot gases, in order to form a precursor, consisting essentially of a carbon black in a reaction stream, and further amounts of the feedstock material used for the carbon black are then introduced to said precursor, with the aim of thus partially quenching the reaction stream and subsequently completely quenching the entire reaction stream. The stream of hot gases can be produced in the form of combustion gas from the reaction of a fuel with an oxidant, such as air, and the ratio of air to fuel here can vary from 1:1 (stoichiometric) up to an infinite ratio.

DESCRIPTION OF THE INVENTION

It is an object of the present invention to provide a carbon black which, in rubber mixtures, exhibits very high reinforcing t, and low hysteresis, with good dispersibility.

The invention provides a carbon black characterized in that the CTAB surface area is from 20 to 49 $m^2/g$, preferably from 30 to 48 $m^2/g$, particularly preferably from 35 to 47 $m^2/g$, very particularly preferably from 38 to 46 $m^2/g$, COAN is greater than 90 ml/(100 g), preferably greater than 95 ml/(100 g), particularly preferably greater than 98 ml/(100 g), with particular preference greater than 100 ml/(100 g), and the sum of CAN and COAN is greater than 235 ml/(100 q), preferably greater than 250 ml/(100 g), particularly preferably greater than 260 ml/(100 g), with particular preference greater than 270 ml/(100 g).

The quartile ratio can be greater than 1.60, preferably from 0.65 to 2.50, particularly preferably from 1.70 to 2.50, very particularly preferably from 1.75 to 2.50, with particular preference from 1.80 to 2.50, extremely preferably from 1.85 to 2.45.

The mode of the aggregate size distribution $D_{St}$ of the carbon black of the invention can be >6000 m² nm/g/CTAB+ 60 nm.

The carbon black of the invention can have been pelletized. The carbon black can particularly preferably have been wet-pelletized.

The ratio of ΔD-50 value to mode of the aggregate size distribution for the carbon black of the invention can be greater than 0.95, preferably greater than 1.0, Very particularly preferably greater than or equal to 1.05.

The $D_W$ value (mass-average particle diameter) of the aggregate size distribution for the carbon black of the invention can be greater than 200 nm.

The tint value for the carbon black of the invention can be smaller than 120, preferably smaller than 105, particularly preferably smaller than 90, very particularly preferably smaller than 75.

The ratio of the number-average diameter to the mode of the aggregate size distribution for the carbon black of the invention can be greater than 1.35, preferably greater than 1.4.

The carbon black of the invention can be a gas black, channel black, lamp black, or furnace black, preferably a furnace black.

The carbon black of the invention can have OAN>100 ml/(100 a), preferably >130 ml/(100 g), particularly preferably >160 ml/(100 g).

The average primary particle size of the carbon black of the invention can be greater than 42 nm, preferably from 43 nm to less than 160 nm, particularly preferably from 43 nm to 90 nm.

The carbon black of the invention can be a carbon black which has not undergone surface modification and which has not undergone post treatment.

The pH of the carbon black of the invention can be >5.

The CTAB value is measured to ASTM D3765-04.

Specific BET and STSA surface area are measured to ASTM D6556-04, with compliance with the parameters relating to relative pressure as in section 10.4.4.

COAN value is measured to ASTM D3493-06, with the following parameters: oil:paraffin; method for endpoint determination: procedure B.

OAN is measured to ASTM D2414-00.

Tint value is measured to ASTM D3265-06, with the following parameters: Hoover Muller paste preparation, Erichsen tint tester—film drawdown method.

pH is measured to ASTM D1512-00.

Primary particle size is measured to ASTM D3849-07.

The quartile ratio is calculated from the aggregate-size distribution.

The aggregate-size distribution here determined to the ISO 15825 standard, first edition, 2004 Nov. 1, with the following modifications:

Supplement to section. 4.6.3 of the ISO 15825 standard: The mode relates to the curve of distribution by mass (mass distribution curve).

Supplement to section 5.1 of the ISO 15825 standard: The equipment used comprises a BI-DCP Particle Sizer with associated dcplw32 evaluation software, Version 3.81, all of which is obtainable from Brookhaven Instruments Corporation, 750 Blue Point Rd., Holtsville, N.Y., 11742.

Supplement to section. 5.2 of the ISO 15825 standard: The equipment used comprises a GM2700 ultrasound control unit, a UW2200 acoustic transducer, and a DH13G sonotrode. The ultrasound control unit, acoustic transducer, and sonotrode are obtainable from Bandelin electronic GmbH & Co. KG, Heinrichstrasse 3-4, D-12207 Berlin. The values set here on the ultrasound control unit are as follows: Power %=50, Cycle=8. This corresponds to a nominal power level set at 100 watts and to pulse levels set at 80%.

Supplement to section. 5.2.1 of the ISO 15825 standard: Ultrasound time is set at 4.5 minutes.

The definition given in section 6.3 of the ISO 15825 standard is varied by defining "surfactant" as follows: "surfactant" is Nonidet P 40 Substitute, which is an anionic surfactant from Fluka, obtainable from Sigma-Aldrich Chemie GmbH, Industriestrasse 25, CH-9471 Buchs SG, Switzerland.

The definition of spin fluid given in section 6.5 of the ISO 15825 standard is varied by defining spin fluid as follows: The spin fluid is produced by taking 0.25 g of Nonidet P 40 Substitute surfactant from Fluka (section 6.3) and making this up to 1000 ml with de-mineralized water (section 6.1). The pH of the solution is then adjusted to from 9 to 10 by using 0.1 mol/l NaOH solution. The spin fluid has to be used at most 1 week after it has been produced.

The definition of dispersion fluid given in section 6.6 of the ISO 15825 standard is varied by defining dispersion fluid as follows: The dispersion fluid is produced by taking 200 ml of ethanol (section 6.2) and 0.5 g of Nonidet P 40 Substitute surfactant from Fluke. (section 6.3) and making this up to 1000 ml with demineralized water (section 6.1). The pH of the solution is then adjusted to from 9 to 10 by using 0.1 mol/l. NaOH solution. The dispersion fluid has to be used at most 1 week after it has been produced.

Supplement to section. 7 of the ISO 15825 standard: The material used is exclusively pelletized carbon black.

The instructions in sections 8.1, 8.2, and 8.3 of the ISO 15825 standard are together replaced by the following instruction: The pelletized carbon black is gently crushed in an agate mortar. 20 ml of dispersion solution (section. 6.6) are then admixed with 20 mg of carbon black in a 30 ml beaded-rim bottle (diameter 28 mm, height 75 mm, wall thickness 1.0 mm) and treated with ultrasound (section 5.2) in a cooling bath (16° C.+/−1° C.) for a period of 4.5 minutes (section 5.2.1) so that the carbon black becomes suspended in the dispersion solution. After the ultrasound treatment, the specimen is measured in the centrifuge within a period of 5 minutes.

Supplement to section 9 of the ISO 15825 standard: The carbon black density value to be entered is 1.86 g/cm³. The temperature for the temperature to be entered is determined in accordance with section 10.11. The option "aqueous" is selected for spin-fluid type. This gives a value of 0.97 (g/cc) for spin-fluid density and a value of 0.917 (cP) for spin-fluid viscosity. The light-scattering correction is applied by using options selectable in the dccplw 32 software: file=carbon.prm; Mie correction.

Supplement to section 10.1 of the ISO 15825 standard: Centrifuge speed is set to 11 000 r/min.

Supplement to section 10.2 of the ISO 15825 standard: 0.85 cm³ of ethanol (section 6.2) is injected instead of 0.2 cm³ of ethanol (section 6.2).

Supplement to section 10.3 of the ISO 15825 standard: Exactly 15 cm³ of spin fluid (section 6.5) are injected. 0.15 cm³ of ethanol (section 6.2) is then injected.

The instruction in section 10.4 of the ISO 15825 standard is omitted completely.

Supplement to section 10.7 of the ISO 15825 standard: Immediately after the start of data recording, the spin fluid in the centrifuge is covered with 0.1 cm³ of dodecane (section 6.4).

Supplement to section 10.10 of the ISO 15825 standard: If the measurement curve does not return to the base line within a period of hour, the measurement is terminated after precisely 1 hour of measurement time, rather than restarting with a different centrifuge-rotation rate.

Supplement to section 10.11 of the ISO 15825 standard: Instead of using the method described in the instructions for determining the measurement temperature, the measurement temperature T to be entered into the computer program is determined as follows:

$$T = \tfrac{2}{3}(Te - Ta) + Ta,$$

where Ta is the temperature of the measurement chamber prior to measurement and Te is the temperature of the measurement chamber after measurement. The temperature difference should not exceed 4° K.

The ΔD-50 value and the mode are likewise obtained from the aggregate size distribution in accordance with the ISO 15825 standard described above.

The invention further provides a process for producing the carbon black of the invention in a furnace-black reactor which comprises, along the reactor axis, a combustion zone, a reaction zone, and a termination zone, via production of a stream of hot exhaust gas in the combustion zone via combustion of a fuel in an oxygen-containing gas and passage of the exhaust gas from the combustion zone without passage through a zone of restricted cross section into the reaction zone and then into the termination zone, mixing to incorporate a feedstock used for the carbon black into the hot exhaust gas in the reaction zone, and termination, of carbon-black formation in the termination zone via introduction of water spray, characterized in that from 20 to 58% by weight, preferably from 30 to 50% by weight, of the feedstock used for the carbon black are introduced through a nozzle radially within the first third of the reaction zone, and the remaining amount of the feedstock used for the carbon black is introduced through a nozzle upstream at least one further point into the reactor.

The reaction zone begins with the first addition of the feedstock for the carbon black, and ends with the quench.

The oxygen-containing gas can be air which is not oxygen-enriched.

The dimensions of the reactor can become greater after the second oil addition. This can be achieved in a plurality of stages or else in one stage. It is preferable to use only one stage.

The cross-sectional area ratio of the reactor cross section at the second oil addition and the reactor cross section in the reaction space downstream thereof can be smaller than 1.0, preferably smaller than 0.5, particularly preferably smaller than 0.1, extremely preferably smaller than 0.05.

The fuel can be liquid, to some extent liquid and to some extent gaseous, or gaseous.

The fuel atomizer used can comprise either atomizers operating purely by using pressure (one-fluid atomizer) or else two-fluid atomizers using internal or external mixing. The fuel can be introduced either by using atomizers operating purely by using pressure (one-fluid atomizers) or else by using two-fluid atomizers with internal or external mixing. If the fuel is liquid, the conditions can be selected in such a way as to balance the following factors: the droplet size achieved during the atomization process, the residence time of these droplets prior to encountering the feedstock used for the carbon black, and the reaction temperatures, in such a way that more than 80% of the mass flow of fuel used is gaseous on encountering the feedstock for the carbon black. In particular, use of two-fluid atomizers and of liquid fuel permits control of droplet size within a wide range independently of throughput, and thus allows this to be balanced with the residence time of the fuel prior to encountering the feedstock used for the carbon black, and with the reaction temperatures.

Droplet-size distribution can be determined with the aid of optical methods. Various commercial nozzle manufacturers supply these measurements as a service, an example being Düsen-Schlick GmbH, D-96253 Untersiemau/Coburg, Germany. The residence time of the droplets, and the reaction temperatures within the process, can be determined on the basis of computer-aided rheological simulation calculations. By way of example, "Fluent", Version 6.3, from Fluent (Fluent Deutschland. GmbH, 64295 Darmstadt) is commercial software which can simulate the furnace reactor used and, after input of all of the ingoing process streams, inclusive of the measured droplet-size distribution, can use its underlying chemical model to calculate the residence times and the vaporization rates of the fuel droplets, and the reaction temperatures.

The feedstocks used for the carbon black can be introduced through nozzles by means of radial lances. The number of: radial lances used can be from 2-32, preferably from 3-16, particularly preferably from 3-8.

The feedstock used for the carbon black can be supplied axially at the start of the reaction zone (first addition of feedstock used for the carbon black).

The feedstock used for the carbon black can be liquid or gaseous, or to some extent liquid and to some extent gaseous. The liquid feedstock used for the carbon black can be atomized by pressure, by steam, by gas, for example compressed air, or by the gaseous feedstock.

Liquid feedstocks that can be used for the carbon black are liquid aliphatic or aromatic, saturated or unsaturated hydrocarbons, compounds containing hydrocarbons, e.g. liquid biomass, or renewable feedstocks, or a mixture thereof, or coal tar, distillates, or residual oils produced during the catalytic cracking of petroleum fractions or during olefin production via cracking of naphtha, or of gas oil.

The gaseous feedstock used for the carbon black can be gaseous aliphatic, saturated or unsaturated hydrocarbons, a mixture thereof, or natural gas.

The "K factor" is often used as a variable to characterize the excess of air. The K factor is the ratio between the amount of air needed for stoichiometric combustion of the fuel and the actual amount of air introduced into the combustion process. A K factor of 1 therefore means stoichiometric combustion. If there is an excess of air, the K factor is smaller than 1. The K factor in the process of the invention can be from 0.2 to 1.0. The K factor can preferably be from 0.3 to 0.9, particularly preferably from 0.3 to 0.8.

The process described is not restricted to any particular reactor geometry, but rather can be adapted to various reactor types and reactor sizes.

The atomizers for the feedstock for the carbon black can be either atomizers operating purely by using pressure (one-fluid atomizers) or else two-fluid atomizers with internal or external mixing. The atomizing medium used for the liquid feedstocks used for the carbon black can be the gaseous feedstock, or else vapor or gases, for example air.

Two-fluid atomizers can be used for atomizing liquid feedstock used for the carbon black. In the case of one-fluid atomizers, a change in throughput can also lead to a change in droplet size, but in the case of two-fluid atomizers the droplet size can be controlled substantially independently of throughput.

If the feedstock used for the carbon black simultaneously comprises liquid feedstock and gaseous feedstock, e.g. methane, the gaseous feedstock can be injected separately from the feedstock by way of a dedicated set of gas lances into the stream of hot exhaust gas.

The carbon blacks of the invention can be used as reinforcing filler or other filler, UV stabilizer, conductive carbon black, or pigment. The carbon blacks of the invention can be used in rubber, plastic, printing inks, inkjet inks, other inks, toners, lacquers, paints, paper, pastes, batteries, and in cosmetics, and in bitumen, concrete, fire-retardant materials and other construction materials. The carbon blacks of the invention can be used as reducing agents for metallurgical purposes.

The carbon blacks of the invention can be used as reinforcing carbon black in rubber mixtures.

The invention further provides rubber mixtures characterized in that they comprise at least one rubber, preferably at least one diene rubber, particularly preferably at least natural rubber, and at least one carbon black of the invention.

The amounts that can be used of the carbon black of the invention are from 10 to 250 phr (parts per hundred rubber), preferably from 20 to 200 phr, particularly preferably from 30 to 170 phr, very particularly or from 30 to 150 phr, based on the amount of the rubber used.

The rubber mixture of the invention can comprise silica, preferably precipitated silica. The rubber mixture of the invention can comprise organosilanes, such as bis(trethoxysilylpropyl)polysulfide or (mercaptoorganyl)alkoxysilanes.

The rubber mixture of the invention can comprise rubber auxiliaries.

Materials suitable for production of the rubber mixtures of the invention are not only natural rubber but also synthetic rubbers. Preferred synthetic rubbers are described by way of example in W. Hofmann, Kautschuktechnologie [Rubber technology], Center Verlag, Stuttgart 1980. They encompass inter alia:
   polybutadiene (BR),
   polyisoprene (IR),
   styrene/butadiene copolymers, such as emulsion SBR (ESBR) or solution SBR (SSBR), preferably having styrene content of from 1 to 60% by weight, particularly preferably from 2 to 50% by weight, based on the entirety of the polymer,
   chloroprene (CR),
   isobutylene/isoprene copolymers (IIR),
   butadiene/acrylonitrile copolymers, preferably having acrylonitrile content of from 5 to 60% by weight, preferably from 10 to 50% by weight, based on the entirety of the polymer (NBR),
   partially or fully hydrogenated NBR rubber (HNBR),
   ethylene/propylene/diene copolymers (EPDM)
   ethylene/propylene copolymers (EPM) or
   abovementioned rubbers additionally having functional groups, such as carboxy, silanol, or epoxy groups, examples being epoxidized NR, carboxy-functionalized NBR, or silanol- (—SiOH) or siloxy-functionalized (—Si—OR) SBR,
and also mixtures of these rubbers.

Production of truck-tire substructures can preferably use natural rubber, or else a mixture thereof with diene rubbers. Production of car-Lire substructures can preferably use SBR, or else a mixture thereof with other diene rubbers.

The rubber mixtures of the invention can comprise further rubber auxiliaries, such as reaction accelerators, antioxidants, heat stabilizers, light stabilizers, antiozonants, processing aids, plasticizers, tackifiers, blowing agents, dyes, pigments, waxes, extenders, organic acids, retarders, metal oxides, and also activators, such as diphenylguanidine, triethanolamine, polyethylene glycol, alkoxy-terminated polyethylene glycol, or hexanetriol, these being known in the rubber industry.

The amounts used of the rubber auxiliaries can be conventional, depending inter alia the intended use. Examples of conventional amounts can be amounts of from 0.1 to 50 phr, based on rubber.

Crosslinking agents that can be used are sulfur, organic sulfur donors, or radiation, or free radical generators. The rubber mixtures of the invention can moreover comprise vulcanization accelerators.

Examples of suitable vulcanization accelerators can be mercaptobenzthiazoles, sulfenamides, guanidines, thiurams, dithiocarbamates, thioureas and thiocarbonates.

The amounts that can be used of the vulcanization accelerators and crosslinking agents are from 0.1 to 10 phr, preferably from 0.1 to 5 phr, based on rubber.

The blending of the rubbers with the filler, and if appropriate with rubber auxiliaries, and if appropriate with the organosilanes, can be conducted in or on conventional mixing assemblies, such as rolls, internal mixers, and mixing extruders. Rubber mixtures of this type can usually be produced in an internal, mixer, beginning with one or more successive thermomechanical mixing stages in which the following are incorporated: the rubbers, the carbon black of the invention, if appropriate the silica, and if appropriate the organosilanes, and the rubber auxiliaries, at from 100 to 170° C. The sequence of addition and the juncture of addition of the individual components can have a decisive effect here on the properties obtained from the mixture. The crosslinking chemicals can then be admixed with the resultant rubber mixture in an internal mixer or on a roll system at from 40 to 130° C., preferably from 50 to 120° C., the mixture then being processed to give what is known as the crude mixture for the process steps that follow, examples being shaping and vulcanization.

The vulcanization of the rubber mixtures of the invention can take place at temperatures of 80 to 200° C., preferably from 130 to 180° C., if appropriate under pressure of from 10 to 200 bar.

The rubber mixtures of the invention are suitable for production of moldings, e.g. for the production of pneumatic or other tires, tire substructure, cable sheathing, hoses, drive belts, conveyor belts, roll coverings, shoe soles, sealing rings, profiles, and damping elements.

An advantage of the carbon black of the invention is very high shear modulus together with low loss modulus in rubber mixtures. Another feature of the carbon black is that it markedly suppresses die swell of the polymer. The carbon black of the invention has very good dispersibility in polymers.

EXAMPLES

Example 1

Production of Carbon Black

The carbon black of the invention is produced in the carbon-black reactor shown in FIG. 1.

FIG. 1 shows a longitudinal section through the furnace reactor. The carbon-black reactor has a combustion chamber 5, in which the hot process gas for the pyrolysis of the carbon black oil is produced via hyperstoichiometric combustion of a fuel. Gaseous or liquid fuels can be used to produce the carbon black of the invention.

The combustion air is introduced by way of a plurality of apertures 2, distributed concentrically with respect to the fuel supply. The fuel is added by way of burners mounted on the end of the combustion chamber.

There is also an oil lance 1 introduced into the combustion chamber, by way of which the feedstock used for the carbon black is introduced into the reactor. The oil lance can be displaced axially in order to optimize conduct of the process of the invention. The combustion chamber narrows conically to the zone of restricted cross section 6. The feedstock used for the carbon black is introduced through nozzles by means of radial lances 3 in or prior to the one of restricted cross section. After passage through the zone of restricted cross section, the reaction gas mixture flows into the reaction chamber 7.

L3 and L5 indicate various positions for the injection of the carbon black oil into the hot process gas by means of the oil lances 1 and 3. Suitable spray nozzles have been provided at the head of the oil lances. At each injection position, there are at least four injectors distributed over the periphery of the reactor.

In the termination zone, water is sprayed into the system via the quench-water lance 4.

FIG. 1 uses the Roman numerals I to III to characterize combustion zone, reaction zone, and termination zone. The exact axial dimension of these depends on the respective positioning of the burner lance, of the oil lances, and of the quench-water lance. The reaction zone begins with the first addition of the feedstock used for the carbon black, and ends with water addition at L4.

The dimensions of the reactor used can be found I in the following list:

| | | |
|---|---|---|
| Greatest diameter of combustion chamber D1: | | 930 mm |
| Length of combustion chamber up to narrowest section L1: | | 1670 mm |
| Length of conical part of combustion chamber L2: | | 1300 mm |
| Diameter of zone of restricted cross section D2: | | 114 mm |
| Length of zone of restricted cross section L6: | | 80 mm |
| Diameter of reaction chamber D3: | | 875 mm |
| Position of oil lances | L5 | 40 mm |
| | L3 | 1300 mm |
| Maximum position of quench-water lance(s) L4 | | 8290 mm |

To produce the carbon blacks of the invention, natural gas can be used as fuel, and the feedstock used for the carbon black can comprise a carbon black oil having carbon content of 91% by weight and having hydrogen content of 6% by weight. Comparative carbon blacks used are Corax® N550 and Corax® N660 obtainable from Evonik Degussa GmbH.

The reactor parameters for production of the carbon blacks of the invention are listed in Table 1. The carbon blacks produced are subjected to the conventional wet pelletization process prior to characterization and incorporation into the rubber mixtures.

TABLE 1

| Reactor parameter | Unit | |
|---|---|---|
| Combustion air | Nm³/h | 1600 |
| Temperature of combustion air | °C. | 520 |
| Fuel (carbon black oil) | kg/h | 0 |
| Fuel (natural gas) | Nm³/h | 82 |
| Feedstock pos. L5 | kg/h | 375 |
| Atomizer air pos. L3 | Nm³/h | 160 |
| Feedstock pos. L3 | kg/h | 290 |

TABLE 1-continued

| Reactor parameter | Unit | |
|---|---|---|
| Carbon black oil temperature | °C. | 115 |
| Quench position L4 | mm | 8290 |

Table 2 lists the analytical data for the carbon blacks produced:

TABLE 2

| Analytical data | | | | |
|---|---|---|---|---|
| | | Carbon black | | |
| Analytical data | | Comparative carbon black 1 Corax® N 550 | Comparative carbon black 2 Corax® N 660 | Inventive carbon black Carbon black 1 |
| CTAB | m²/g | — | — | 44 |
| STSA | m²/g | 42 | 36 | 41 |
| OAN | cm³/(100 g) | 121 | 87 | 178 |
| COAN | cm³/(100 g) | 88 | 74 | 102 |
| BET | m²/g | 42 | 36 | 42 |
| Tint value | | 62 | 61 | 51 |
| Quartile ratio | | 1.53 | 1.6 | 1.95 |
| Fraction >150 nm[1] | % | 67 | 63 | 84 |
| Mode | nm | 166 | 158 | 202 |
| ΔD-50 | nm | 126 | 130 | 218 |
| ΔD-50/mode | | 0.76 | 0.82 | 1.08 |

[1] Proportion by mass of carbon black with aggregate size more than 150 nm (determined from aggregate size distribution)

Example 2

Vulcanizate Tests in Natural Rubber

Table 3 below gives the formulation used for the natural rubber mixtures. The unit phr here means parts by weight, based on 100 parts of the crude rubber used.

The general method for the production of rubber mixtures and vulcanizates thereof is described in the following book: "Rubber Technology Handbook", W. Hofmann, Hanser Verlag 1994.

TABLE 3

| | Mixture 1 | Mixture 2 |
|---|---|---|
| | Carbon black type | |
| | Comparative carbon black 1 phr | Carbon black 1 phr |
| Stage 1 | | |
| NR SMR 10 | 100.0 | 100.0 |
| Carbon black | 52.0 | 52.0 |
| Stearic acid | 3.0 | 3.0 |
| ZnO | 3.0 | 3.0 |
| Vulkanox® 4020 | 1.0 | 1.0 |
| Vulkanox® HS | 1.0 | 1.0 |
| Protektor® G3108 | 1.0 | 1.0 |
| Stage 2 | | |
| Stage 1 batch | | |
| Sulfur | 1.5 | 1.5 |
| Rhenogran® TBBS-80 | 1.2 | 1.2 |

SMR10 natural rubber, ML4=from 60-70, is SMR10 which is masticated on a roll mill by the usual methods prior to the incorporation mixing process, with at least 24 hours, but at most 1 week, of intermediate storage at room temperature after the mastication process. The ML 1+4 (100° C.) value for this masticated SMR10 is in the range from 60 to 70. The ML 1+4 value is measured to DIN 53523/3. The natural rubber is obtainable from Lanxess.

Vulkanox® 4020 is the antioxidant 6PPD from Rhein Chemie GmbH. Vulkanox® HS is the antioxidant TMQ from Lanxess AG. Protektor® G3108 is an antiozonant wax from Paramelt. B. V. Rhenogran® TBBS-80 is a TBBS-type vulcanization accelerator from Bayer AG, comprising 80% of active ingredient.

The stearic acid is EDENOR ST1 from Caldic Deutschland GmbH.

The ZnO is ZnO RS RAL 844 C from Arnsperger Chemikalien GmbH, 50858 Cologne, Germany.

The sulfur vulcanizing agent is 80/90 KMS around sulfur from Laborchemie Handelsgesellschaft Sankt Augustin, Germany. The carbon black used is either comparative carbon black 1 (CORAX® N550) or the carbon black. "carbon black 1" of the invention. Comparative carbon black 1 is obtainable from Evonik Degussa GmbH.

The rubber mixtures were produced in an internal mixer in accordance with the mixing specification in Table 4.

TABLE 4

| Stage 1 Settings | |
|---|---|
| Mixing assembly | Werner und Pfleiderer GK 1.5N |
| Rotation rate | 65 rpm |
| Ram pressure | 5.5 bar |
| Capacity | 1.6 l |
| Fill level | 0.70 |
| Chamber temperature | 70° C. |
| Friction | 1:1.11 |
| Batch temperature | 145-155° C. |
| Mixing procedure | |
| 0 up to 1 min | Natural rubber |
| 1 up to 2 min | ½ carbon black |
| | ½ carbon black, stearic acid, ZnO, Vulkanox ® 4020, Vulkanox ® HS, Protektor ® G3108r |
| 2 up to 5 min | purge |
| 5 up to 6 min | mix and discharge |
| Storage | 24 h at room temperature |
| Stage 2 Settings | |
| Mixing assembly | Werner und Pfleiderer GK 1.5N |
| Rotation rate | 50 rpm |
| Ram pressure | 5.5 bar |
| Capacity | 1.6 l |
| Fill level | 0.68 |
| Chamber temperature | 60° C. |
| Friction | 1; 1.11 |
| Batch temperature | 100-110° C. |
| Mixing procedure | |
| 0 up to 2 min | Stage 1 batch, sulfur, Rhenogran ® TBBS-80 |
| Batch temperature | 100-110° C. |
| 2 min | Discharge and form milled sheet on Troester WNU 1 laboratory roll mill (diameter 150 mm, length 350 mm, roll temperature 40/50° C., 17/21 rpm) Homogenize: |
| | Cut the material and fold it over 3 times toward the left and 3 times toward the right, and roll the material 3 times with narrow roll gap (3 mm) and 3 times with wide roll gap (6 mm), and then draw off milled sheet. |

Table 5 collates the methods used for rubber testing. These also apply to the following examples.

TABLE 5

| Physical testing/conditions | Standard |
|---|---|
| Ring tensile test 1, 23° C. | DIN 53504, ISO 37 |
| Tensile strength (MPa) | |
| Modulus at 100% elongation (MPa) | |
| Modulus at 300% elongation (MPa) | |
| Elongation at break (%) | |
| Goodrich flexometer test, | DIN 53533, ASTM D623 A |
| 0.175 inch displacement, 2 h, 23° C. | |
| Needle temperature (° C.) | |
| Shore hardness, 23° C. | DIN 53505, ISO 7619-1 |
| Shore A | |
| DIN abrasion, 10N, 23° C. | DIN ISO 4649 |
| Abrasion (mm*mm*mm) | |
| MTS | DIN 53513, ISO 4664-1 |
| E* at 60° C., 50 ± 25N | |
| tan d at 60° C., 50 ± 25N | |
| E* at 60° C., 1 ± 0.5 mm | |
| tan d at 60° C., 1 ± 0.5 mm | |
| MDR | |
| RPA 2000 equipment is used to determine the torque elements S' and S". | |
| S' at 60° C., 1.6 Hz and ±0.5° | |
| S" at 60° C., 1.6 Hz and ±0.5° | |
| tanδ at 60° C., 1.6 Hz and ±0.5° | |
| Electrical resistance | |
| Milli-T03 equipment is used to determine volume resistance and surface resistance | |
| Dispersion (Topography) | DE 19917975 A1 |
| High-pressure capillary rheometer | |
| A rheograph 6000 high-pressure capillary rheometer is used to determine apparent viscosity/apparent shear rate | |
| Density | DIN 53 479 (Meth. A), ISO 2781 Meth. A |
| Ball rebound | ASTM D 2632 |
| Compression set | DIN 53 533, ASTM D623 A, ISO 4664-3 |

The specimen-preparation method used for resistance measurement is as follows:

The specimens are stamped out from the vulcanizate sheet of thickness 2 mm by using a circular blade (Ø=82 mm), and they are degreased with isopropanol. Calipers (Ø=30 mm) are used to measure the thickness of the test specimen precisely to 0.01 mm at a plurality of locations. The average thickness of the specimen is used to calculate volume resistivity.

A circular template and a silver marker were used to mark the areas to be covered with conductive silver 200 paint. The conductive silver paint is applied and the test specimen is ready for measurement after one hour of drying time. Milli-T03 equipment from Fischer Elektronik is used to determine electrical volume resistance and electrical surface resistance.

A Rheograph 6000 high-pressure capillary rheometer from Göttfert, D-74711 Buchen is used to determine apparent viscosity at a temperature of 100° C.

RPA 2000 equipment from Alpha Technologies UK, 74078 Heilbronn 2:0 is used to apply dynamic shear in order to measure the torque elements S' and S".

Table 6 shows the results of vulcanizate testing. The vulcanization time for the mixtures is 15 minutes at 150° C.

TABLE 6

| | | Natural rubber mixture | |
|---|---|---|---|
| | | Mixture 1 | Mixture 2 |
| | | Carbon black (52 phr) | |
| | | Comparative carbon black 1 | Carbon black 1 |
| Vulcanizate data | | | |
| Vulcanization time | min | 15 | 15 |
| Tensile strain properties | | | |
| Tensile strength | MPa | 20.1 | 19.9 |
| 100% modulus | MPa | 2.7 | 3.2 |
| 300% modulus | MPa | 14.3 | 15.6 |
| Elongation at break | % | 441 | 414 |
| Shore hardness | Shore A | 62 | 65 |
| DIN abrasion | mm³ | 103 | 98 |
| Abrasion-resistance index | | 100 | 105 |
| Viscoelastic properties | | | |
| Goodrich flexometer | | | |
| Needle temperature | ° C. | 75 | 75 |
| Rolling-resistance index | % | 100 | 100 |
| MTS E * 60° C. 50 +/− 25N | MPa | 8.12 | 9.08 |
| MTS tan δ 60° C. 50 +/− 25N | — | 0.080 | 0.076 |
| MTS E * 60° C. 1 +/− 0.5 mm | MPa | 8.07 | 9.06 |
| MTS tan δ 60° C. 1 +/− 0.5 mm | — | 0.076 | 0.072 |
| MDR tan δ 60° C. | | 0.109 | 0.103 |
| Electrical resistance | | | |
| Electrical volume resistance | Ohm cm | 15 400 | 6 700 |
| Electrical surface resistance | Ohm | 13 900 | 5 550 |
| Dispersion (topography) | % | 1.5 | 1.0 |

The higher the DIN abrasion (mm³) value, the poorer the abrasion resistance of the rubber mixture. The abrasion-resistance index is therefore calculated for each carbon black within the respective carbon black group, as follows:

Abrasion-resistance index=(DIN abrasion of reference carbon black/DIN abrasion)*100.

An abrasion-resistance index>100 therefore indicates improved abrasion resistance, and values<100 indicate impaired abrasion resistance, relative to the respective reference carbon black.

The higher the needle temperature (° C.) value, the higher the level of heat generation and therefore the higher the hysteresis on dynamic stress within the rubber mixture, the expected rolling resistance therefore being poorer.

Rolling-resistance index=(needle temperature of reference carbon black/needle temperature)*100.

A rolling-resistance index>100 therefore indicates improved, i.e. reduced, rolling resistance, and values<100 indicate impaired rolling resistance, relative to the respective reference carbon black.

The results in Table 6 show that when the carbon blacks of the invention are compared with the comparative carbon black they exhibit higher stiffness both in the shear experiment and in the elongation experiment, because of the higher structure value. This allows the density of the mixture to be lowered by reducing carbon black content to give the level, of reinforcement of the comparative carbon black. The higher structure value moreover results in larger aggregates for identical primary particle size. This finally leads to lower tan(δ) values. A corresponding reduction of carbon black content to give a hardness level comparable to that with comparative carbon black 1 will further lower the tan(δ) values.

Example 3

Vulcanizate Testing in EPDM

Table 7 below gives the formulation used for the EPDM mixtures.

TABLE 7

| | Mixture 3 | Mixture 4 | Mixture 5 | Mixture 6 |
|---|---|---|---|---|
| | Carbon black type | | | |
| | Comparative carbon black 1 phr | Carbon black 1 phr | Carbon black 1 phr | Carbon black 1 phr |
| Stage 1 | | | | |
| BUNA EP G 5455 | 150 | 150 | 150 | 150 |
| Carbon black | 130 | 130 | 130 | 130 |
| Stearic acid | 2.0 | 2.0 | 2.0 | 2.0 |
| ZnO | 5.0 | 5.0 | 5.0 | 5.0 |
| LIPOXOL 4000 | 2.0 | 2.0 | 2.0 | 2.0 |
| SUNPAR 150 | 50 | 50 | 60 | 70 |
| Stage 2 | | | | |
| Stage 1 batch | | | | |
| Sulfur | 1.50 | 1.50 | 1.50 | 1.50 |
| Vulkacit ® Merkapto C | 1.00 | 1.00 | 1.00 | 1.00 |
| Rhenocure TP/S | 2.00 | 2.00 | 2.00 | 2.00 |
| PERKAZIT TBZTD-PDR-D | 1.20 | 1.20 | 1.20 | 1.20 |

LIPDXOL 4000 is polyethylene glycol with molar mass of 4000 g/mol from Brenntag GmbH.

BUNA EPG 5455 is an EPDM rubber from Rhein Chemie GmbH, Germany.

SUNPAR 150 is a paraffinic oil from Schill & Seilacher GmbH.

PERKAZIT TBZTD PDR D is a TBZTD vulcanization accelerator from Weber & Schaer.

Stearic acid is EDENOR ST1 from Caldic Deutschland GmbH.

The vulcanization accelerator Vulkacit® Merkapto C is 2-mercaptobenzothiazole from Rhein Chemie GmbH.

Rhenocure TP/S is a vulcanization accelerator from Rhein Chemie GmbH.

The ZnO is ZnO RS RAL 844 C from Arnsperger Chemikalien GmbH, 50858 Cologne, Germany.

The sulfur vulcanizing agent is 80/90 KMS ground sulfur from Laborchemie Handelsgesellschaft Sankt Augustin, Germany.

The carbon black used is either comparative carbon black 1 (CORAX® N550) or the carbon black "carbon black 1" of the invention. Comparative carbon black 1 is obtainable from Evonik Degussa GmbH.

The rubber mixtures were produced in an internal mixer in accordance with the mixing specification in Table 8.

TABLE 8

Stage 1
Settings

| | |
|---|---|
| Mixing assembly | Werner und Pfleiderer GK 1.5N |
| Rotation rate | 80 rpm |
| Ram pressure | 5.5 bar |
| Capacity | 1.6 l |
| Fill level | 0.80 |
| Chamber temperature | 90° C. |
| Friction | 1:1.11 |
| Batch temperature | 150-160° C. |
| Mixing procedure | |
| 0 up to 1 min | rubber |
| 1 up to 3 min | carbon black, stearic acid, ZnO, Lipoxol, Sunpar 150, purge |
| 3 up to 4 min | mix and discharge |
| Storage | 24 h at room temperature |

Stage 2
Settings

| | |
|---|---|
| Mixing assembly | Werner und Pfleiderer GK 1.5N |
| Rotation rate | 50 rpm |
| Ram pressure | 5.5 bar |
| Capacity | 1.6 l |
| Fill level | 0.78 |
| Chamber temperature | 70° C. |
| Friction | 1:1.11 |
| Batch temperature | 100-120° C. |
| Mixing procedure | |
| 0 up to 1 min | Stage 1 batch |
| 1 up to 2 min | accelerator, sulfur |
| 2 min | Discharge |
| 2 min | Discharge and form milled sheet on Troester WNU 1 laboratory roll mill (diameter 150 mm, length 350 mm, roll temperature 40/50° C., 17/21 rpm) Homogenize: |
| | Cut the material and fold it over 3 times toward the left and 3 times toward the right, and roll the material 6 times with narrow roll gap (3 mm), and 6 times with wide roll gap (6 mm), and then draw off milled sheet. |
| Batch temperature | 100-120° C. |

Table 9 shows the results of vulcanizate testing. The vulcanization time for the mixtures is 1.6 minutes at 170° C.

TABLE 9

| | | EPDM mixture | | | |
|---|---|---|---|---|---|
| | | Mixture 3 | Mixture 4 | Mixture 5 | Mixture 6 |
| | | | Carbon black (130 phr) | | |
| | | Comparative carbon black 1 | Carbon black 1 | Carbon black 1 | Carbon black 1 |
| SUNPAR | phr | 50 | 50 | 60 | 70 |
| Vulcanizate data | | | | | |
| Vulcanization time | min | 16 | 16 | 16 | 16 |
| Tensile strain properties | | | | | |
| Tensile strength | MPa | 11.6 | 12.1 | 12.4 | 11.4 |
| 100% modulus | MPa | 3.4 | 4.2 | 3.8 | 3.1 |
| 300% modulus | MPa | 12.2 | 12.6 | 12.3 | 10.4 |
| Elongation at break | % | 327 | 309 | 331 | 367 |
| Shore hardness | Shore A | 64 | 69 | 66 | 63 |
| High-pressure capillary rheometer | | | | | |
| Apparent shear rate | 1/s | 66.8 | 67.4 | 72.9 | 95.8 |
| Apparent viscosity | Pas | 3357 | 3326 | 3069 | 2339 |
| Density | g/cm³ | 1.097 | 1.095 | 1.090 | 1.078 |
| Viscoelastic properties | | | | | |
| Ball rebound 60° C. | % | 48.3 | 50.8 | 51.0 | 50.8 |
| Compression set 22 h/70° C. | % | 7.4 | 6.9 | 7.2 | 8.1 |
| MDR S' +−0.5°, 1.6 Hz, * 60° C. | dNm | 20.00 | 24.68 | 21.72 | 17.6 |
| MDR S" +−0.5°, 1.6 Hz, 60° C. | dNm | 3.65 | 3.94 | 3.32 | 2.79 |
| MDR tan δ +−0.5°, 1.6 Hz, 60° C. | — | 0.183 | 0.160 | 0.153 | 0.159 |

TABLE 9-continued

|  |  | EPDM mixture | | | |
|---|---|---|---|---|---|
|  |  | Mixture 3 | Mixture 4 | Mixture 5 | Mixture 6 |
|  |  | Carbon black (130 phr) | | | |
|  |  | Comparative carbon black 1 | Carbon black 1 | Carbon black 1 | Carbon black 1 |
| Dispersion (topography) | % | 1.6 | 0.3 | 0.1 | 0.6 |

The results in Table 9 show that the carbon blacks of the invention give high hardness, lower tan(δ), higher ball rebound, lower compression set, and higher 300 modulus, higher S' value, and markedly better dispersion. With addition of SUNPAR oil, the property profile is lowered. When from 60 phr to 70 phr of oil are added, the resultant property profile is similar to that of the reference mixture. However, the good dispersion properties are retained even for high oil contents. The viscosity of the uncrosslinked mixture (50 phr of SUNPAR oil) is comparable with that of the reference mixture. As oil content rises, the viscosity of the mixture falls as expected, and this is attended by better processability.

Example 4

Vulcanizate Testing in NR/SBR

The formulation used for the NR/SBR mixtures is stated in Table 10 below.

Krynol 1712 is an SBR from Rhein Chemie.
The vulcanization accelerator Vulkacit® DM/MG-C is MATS from Rhein Chemie.
NR RSS 1 is natural rubber obtainable from Krahn Chemie.
Vulkanox HS/LG is TMQ from Rhein Chemie.
The antioxidant Vulkanox® 4020/LG is 6PPD from Lanxess AG.
Stearic acid is EDENOR ST1 from Caldic Deutschland GmbH.
The vulcanization accelerator Vulkacit® CZ/EG-C is CBS from Lanxess AG.
The ZnC is MnO RS PAL 844 C from Arnsperger Chemikalien GmbH, 50858 Cologne, Germany.
The vulcanizing agent sulfur is 100% ground sulfur from Bali Chemie AG, Hanover, Germany.
The carbon black used is either comparative carbon black 1 (CORAX® N550), comparative carbon black 2 (CORAX® N660) or the carbon black "carbon black 1" of the invention. The comparative carbon blacks CORAX® N550 and CORAX® N660 are obtainable from Evonik Degussa GmbH.

TABLE 10

|  | Mixture 7 | Mixture 8 | Mixture 9 | Mixture 10 | Mixture 11 | Mixture 12 |
|---|---|---|---|---|---|---|
|  | | | Carbon black type | | | |
|  | Comparative carbon black 1 phr | Carbon black 1 phr | Carbon black 1 phr | Carbon black 1 phr | Comparative carbon black 2 phr | Comparative carbon black 2 phr |
| Stage 1 | | | | | | |
| NR RSS 1 ML4 60-70 | 60 | 60 | 60 | 60 | 60 | 60 |
| Krynol 1712 | 55 | 55 | 55 | 55 | 55 | 55 |
| Carbon black | 50 | 50 | 47 | 44 | 50 | 58 |
| Stearic acid | 2.0 | 2.0 | 2.0 | 2.0 | 2.0 | 2.0 |
| ZnO | 5.0 | 5.0 | 5.0 | 5.0 | 5.0 | 5.0 |
| Vulkanox ® 4020 LG | 1 | 1 | 1 | 1 | 1 | 1 |
| Vulkanox ® HS/LG | 0.6 | 0.6 | 0.6 | 0.6 | 0.6 | 0.6 |
| Stage 2 | | | | | | |
| Stage 1 batch | | | | | | |
| Sulfur | 1.60 | 1.60 | 1.60 | 1.60 | 1.60 | 1.60 |
| Vulkacit ® CZ/EG-C | 1.40 | 1.40 | 1.40 | 1.40 | 1.40 | 1.40 |
| Vulkacit ® DM/MG-C | 1.00 | 1.00 | 1.00 | 1.00 | 1.00 | 1.00 |

The rubber mixtures are produced in an internal mixer in accordance with the mixing specification in Table 11. The vulcanization time of the mixtures is 20 minutes at 150° C.

TABLE 11

| Stage 0 Settings | |
|---|---|
| Mixing assemblies | Werner and Pfleiderer GK 4N |
| Rotation rate | 50 rpm |
| Ram pressure | 5.5 bar |
| Capacity | 3.65 l |
| Fill level | 0.70 |
| Chamber temperature | 50° C. |
| Friction | 1:1.11 |
| Batch temperature | 140° C.-160° C. |
| Mixing procedure | |
| | NR rubber is masticated to ML(1 + 4) = 60-70 |
| Storage | 24 h at room temperature |
| Stage 1 Settings | |
| Mixing assemblies | Werner and Pfleiderer GK 1.5 E, |
| Rotation rate | 60 rpm |
| Ram pressure | 5.5 bar |
| Capacity | 1.58 l |
| Fill level | 0.55 |
| Chamber temperature | 80° C. |
| Friction | 1:1 |
| Batch temperature | 145°-155° C. |
| Mixing procedure | |
| 0 up to 1 min | NR, SBR |
| 1 up to 2 min | ½ of carbon black, ZnO, stearic acid |

TABLE 11-continued

| 2 up to 3 min | ½ of carbon black, Vulkanox ® 4020/LG, TMQ, purge mixing (up to 150° C.) and possibly |
| --- | --- |
| 3 up to 4 min | regulation of rotation rate |
| 4 up to 4 min | aeration |
| 4 up to 5 min | mix and discharge |
| Storage | 24 h at room temperature |
| Stage 2 Settings | |
| Mixing assemblies | Werner and Pfleiderer GK 1.5 E |
| Rotation rate | 40 rpm |
| Ram pressure | 5.5 bar |
| Capacity | 1.58 l |
| Fill level | 0.55 |
| Chamber temperature | 50° C. |
| Friction | 1:1 |
| Batch temperature | 90-110° C. |
| Mixing procedure | |
| 0 up to 2 min | Stage 1 batch, sulfur, Vulkacit ® CZ/EG-C, |
| 2 min | MBTS discharge and form milled sheet on Troester WNU 1 laboratory roll mill (diameter 150 mm, length 350 mm, roll temperature 40/50° C., 17/21 rpm) Homogenize: |
| | roll the material over 3 times with narrow roll gap (3 mm) and 3 times with wide roll gap (6 mm), and cut the material and fold it over 3 times toward the left and 3 times toward the right, and draw off milled sheet. |

Table 12 shows the results of vulcanizate testing.

TABLE 12

| | | NR/ESBR mixture | | | | | |
|---|---|---|---|---|---|---|---|
| | | Mixture 7 Comparative carbon black 1 | Mixture 8 Carbon black 1 | Mixture 9 Carbon black 1 | Mixture 10 Carbon black 1 | Mixture 11 Comparative carbon black 2 | Mixture 12 Comparative carbon black 2 |
| Carbon black | phr | 50 | 50 | 47 | 44 | 50 | 58 |
| Vulcanizate data | | | | | | | |
| Vulcanization time | min | 20 | 20 | 20 | 20 | 20 | 20 |
| Tensile strain properties | | | | | | | |
| Tensile strength | MPa | 13.6 | 13.5 | 8.5 | 12.1 | 12.8 | 13.7 |
| 100% modulus | MPa | 2.3 | 3.0 | 2.6 | 2.4 | 2.1 | 2.4 |
| 300% modulus | MPa | 11.0 | 14.0 | — | 12.2 | 10.4 | 12.0 |
| Elongation at break | % | 392 | 318 | 280 | 325 | 386 | 366 |
| Shore hardness | Shore A | 60 | 63 | 61 | 59 | 57 | 60 |
| Density | g/cm³ | 1.120 | 1.122 | 1.114 | 1.106 | 1.122 | 1.141 |
| DIN abrasion | mm³ | 125 | 113 | 117 | 120 | 133 | 124 |
| Abrasion resistance index | % | 100 | 111 | 107 | 104 | 94 | 101 |
| Goodrich needle temperature | ° C. | 81 | 80 | 77 | 75 | 71 | 80 |
| Rolling resistance index | % | 100 | 101 | 105 | 108 | 114 | 101 |
| Viscoelastic properties | | | | | | | |
| Ball rebound 60° C. | % | 69.6 | 72.3 | 73.0 | 74.3 | 73.2 | 70.3 |
| MTS E * 60° C. 50 +/− 25N | MPa | 7.8 | 8.7 | 8.2 | | 6.9 | 7.7 |
| MTS tan δ 60° C. 50 +/− 25N | | — | 0.092 | 0.080 | 0.074 | 0.068 | 0.074 | 0.086 |
| MTS E * 60° C. 1 +/− 0.5 mm | MPa | 7.68 | 8.9 | 8.3 | 7.9 | 6.8 | 7.7 |
| MTS tan δ 60° C. 1 +/− 0.5 mm | | 0.091 | 0.080 | 0.075 | 0.068 | 0.073 | 0.085 |
| MDR tan δ 60° C. 0.5°, 1.6 Hz | | 0.092 | 0.081 | 0.067 | 0.060 | 0.065 | 0.082 |

TABLE 12-continued

| | | NR/ESBR mixture | | | | | |
|---|---|---|---|---|---|---|---|
| | | Mixture 7 Comparative carbon black 1 | Mixture 8 Carbon black 1 | Mixture 9 Carbon black 1 | Mixture 10 Carbon black 1 | Mixture 11 Comparative carbon black 2 | Mixture 12 Comparative carbon black 2 |
| Dispersion, (topography) | % | 0.5 | 0.5 | 0.4 | 0.3 | 1.7 | 1.2 |

The results in Table 12 show that the carbon black (carbon black 1) of the invention in the NR/ESBR mixture (mixture 8) lead to higher hardness, lower tan(δ) value at 60° C., higher ball rebound, higher 300 modulus, and higher complex modulus E* than in the comparative mixture 7.

If the content of the carbon black of the invention is reduced to 44 phr (mixture 10), the resultant hardness and complex modulus E* are similar to that for mixture 7. In contrast, tan(δ) at 60° C. has been markedly lowered in comparison, with reference mixture 7, giving, for example, reduced rolling resistance if the mixture is used for the substructure of a tire. CORAX® N660 likewise has a low tan(δ) value (60° C.) (mixture 7 and mixture 11) by virtue of its relatively low specific surface area, and if this is used as comparison then the result, for the same hardness and the same complex modulus (mixture 12), is a higher tan(δ) value (60° C.) when comparison is made with the mixture produced with the carbon black of the invention (mixture 10).

What is claimed is:

1. A carbon black, comprising:
a cetyltrimethylammonium bromide (CTAB) surface area of from 20 to 49 m$^2$/g;
a compressed oil absorption number (COAN) greater than 90 ml/(100 g); and a
sum oil absorption number (OAN) and COAN greater than 235 ml/(100 g),
wherein a quartile ratio of the carbon black is greater than 1.60.

2. The carbon black of claim 1, wherein the COAN is greater than 95 ml/(100 g).

3. The carbon black of claim 1, wherein the sum of the OAN and COAN is greater than 250 ml/(100 g).

4. The carbon black of claim 1, wherein the COAN is greater than 98 ml/(100 g).

5. The carbon black of claim 1, wherein the CTAB surface area is from 38 to 46 m$^2$/g.

6. The carbon black of claim 1, wherein the quartile ratio of the carbon black is from 1.65 to 2.50.

7. A composition comprising the carbon black of claim 1.

8. The composition of claim 7, wherein the carbon black is used as a filler, UV stabilizer, conductive carbon black, or pigment.

9. The composition of claim 7, wherein the composition is selected from the group consisting of plastics, inks, toners, lacquers, paints, paper, pastes, batteries, cosmetics, bitumen, concrete, and fire-retardant materials.

10. The composition of claim 9, wherein the composition is a printing ink.

11. The composition of claim 9, wherein the composition is an inkjet ink.

12. The composition of claim 7, wherein the composition is a rubber mixture.

13. The rubber mixture of claim 12, wherein the rubber is a diene rubber.

14. The rubber mixture of claim 13, wherein the diene rubber is a natural rubber, an EPDM rubber, or an SPR rubber.

15. The carbon black of claim 1, wherein the COAN is greater than 90 ml/(100 g) and less than or equal to 102 ml/(100 g) and the sum of the OAN and COAN is greater than 235 ml/(100 g) and less than or equal to 280 ml/(100 g).

16. The carbon black of claim 15, wherein the quartile ratio of the carbon black is from 1.65 to 2.50.

17. The carbon black of claim 16, wherein the COAN is greater

18. The carbon black of claim 16, wherein the CTAB surface area is from 35 to 47 m$^2$/g. than 98 ml/(100 g).

19. The carbon black of claim 16, wherein the CTAB surface area is from 38 to 46 m$^2$/g.

20. The carbon black of claim 16, wherein a mass-average particle diameter is greater than 200 nm and less than or equal to 218 nm.

21. The carbon black of claim 16, wherein the COAN is greater than 95 ml/(100 g), the sum of the OAN and COAN is greater than 250 ml/(100 g) and the CTAB surface area is from 35 to 47 m$^2$/g.

22. A process for producing the carbon black of claim 1 in a furnace-black reactor, wherein the furnace-black reactor comprises, along a reactor axis, a combustion zone, a reaction zone, and a termination zone, the process comprising the steps of:
a) producing a stream of hot exhaust gas in the combustion zone of the furnace-black reactor via combustion of a fuel in an oxygen-containing gas;
b) passing the hot exhaust gas from the combustion zone, without passage through a zone of restricted cross section, into the reaction zone;
c) mixing a feedstock used for the carbon black into the hot exhaust gas in the reaction zone, wherein from 20 to 58% by weight of the feedstock used for the carbon black is introduced through a nozzle radially within a first third of the reaction zone, and a remaining amount of the feedstock used for the carbon black is introduced through a nozzle upstream at one or more further points into the furnace-black reactor;
d) passing the hot exhaust gas into the termination zone where carbon-black formation is terminated by introduction of water spray.

* * * * *